April 3, 1956
A. J. MONTCHAUSSÉ
2,740,843
CROSS-BAR COMMUTATING MECHANISM
Filed Jan. 26, 1950
3 Sheets-Sheet 1
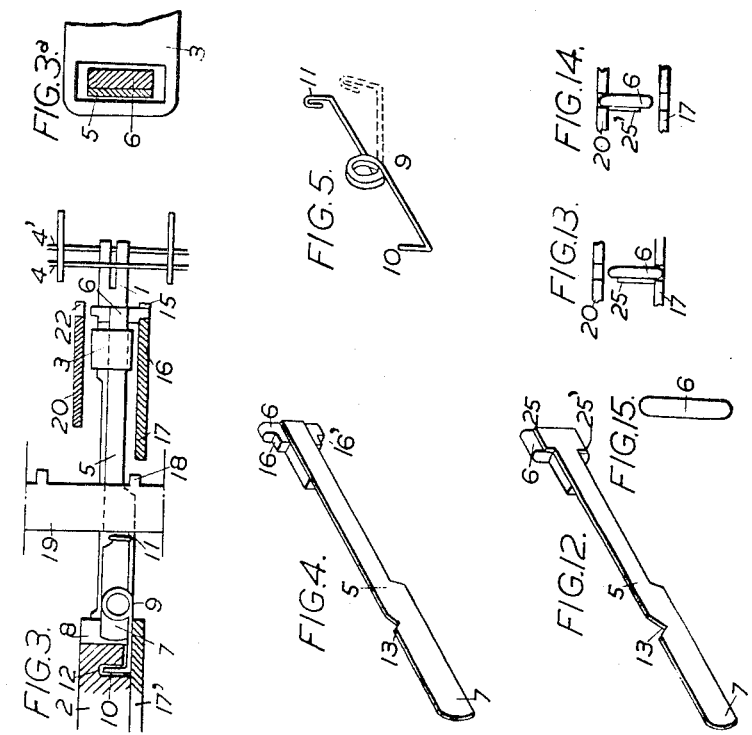
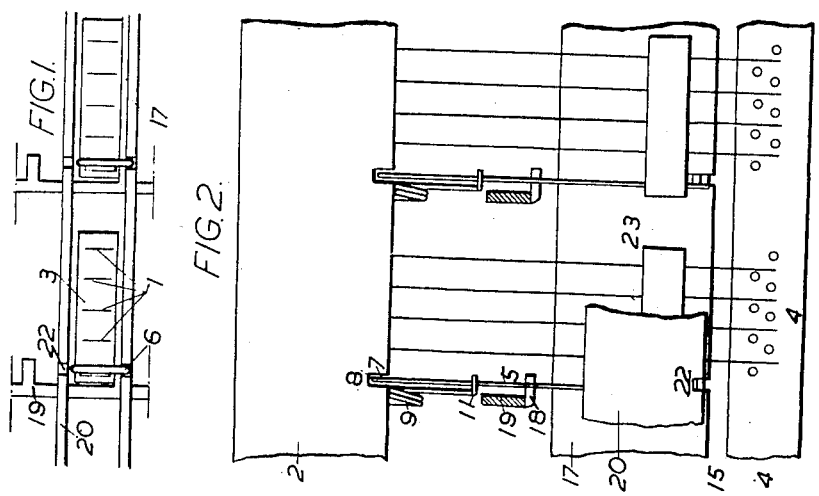
INVENTOR
ANDRE J. MONTCHAUSSE
BY Robert Harding Jr.
ATTORNEY

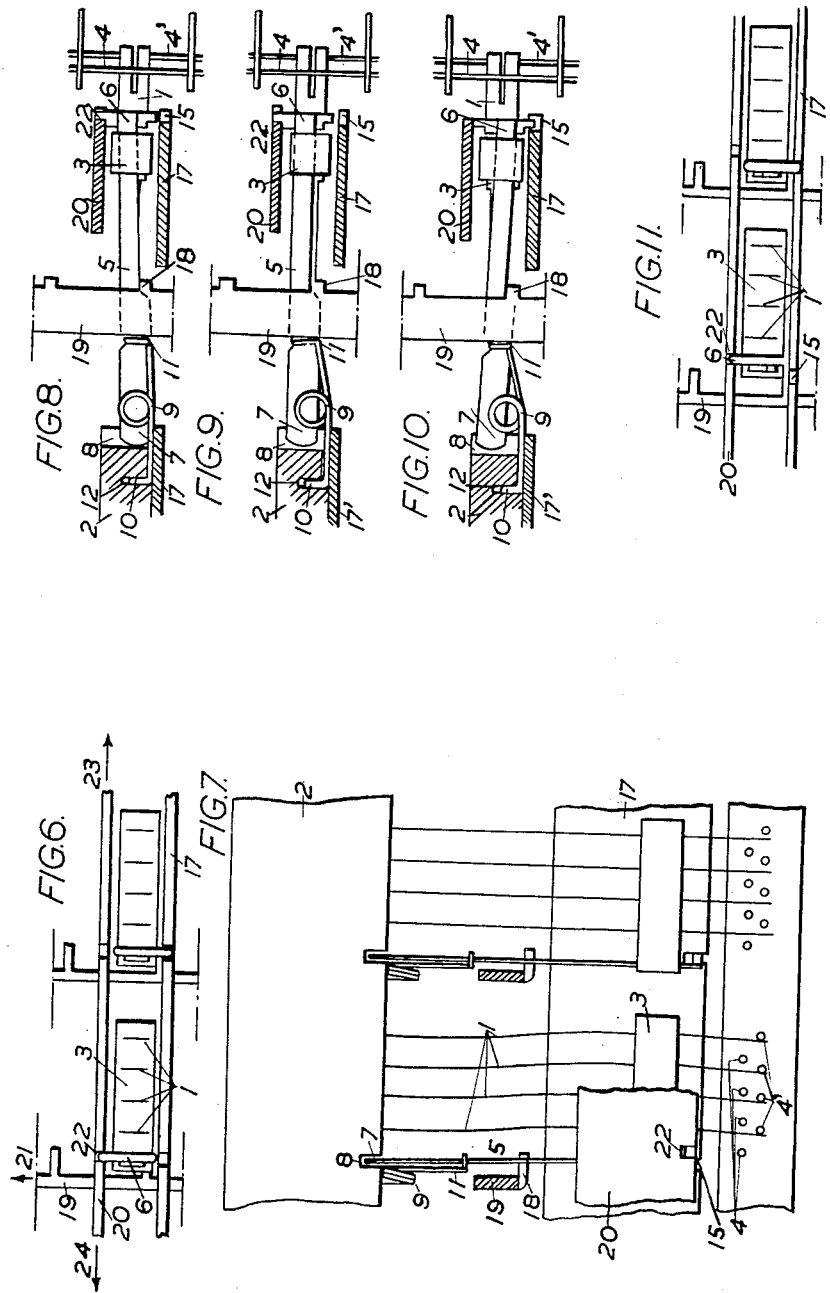

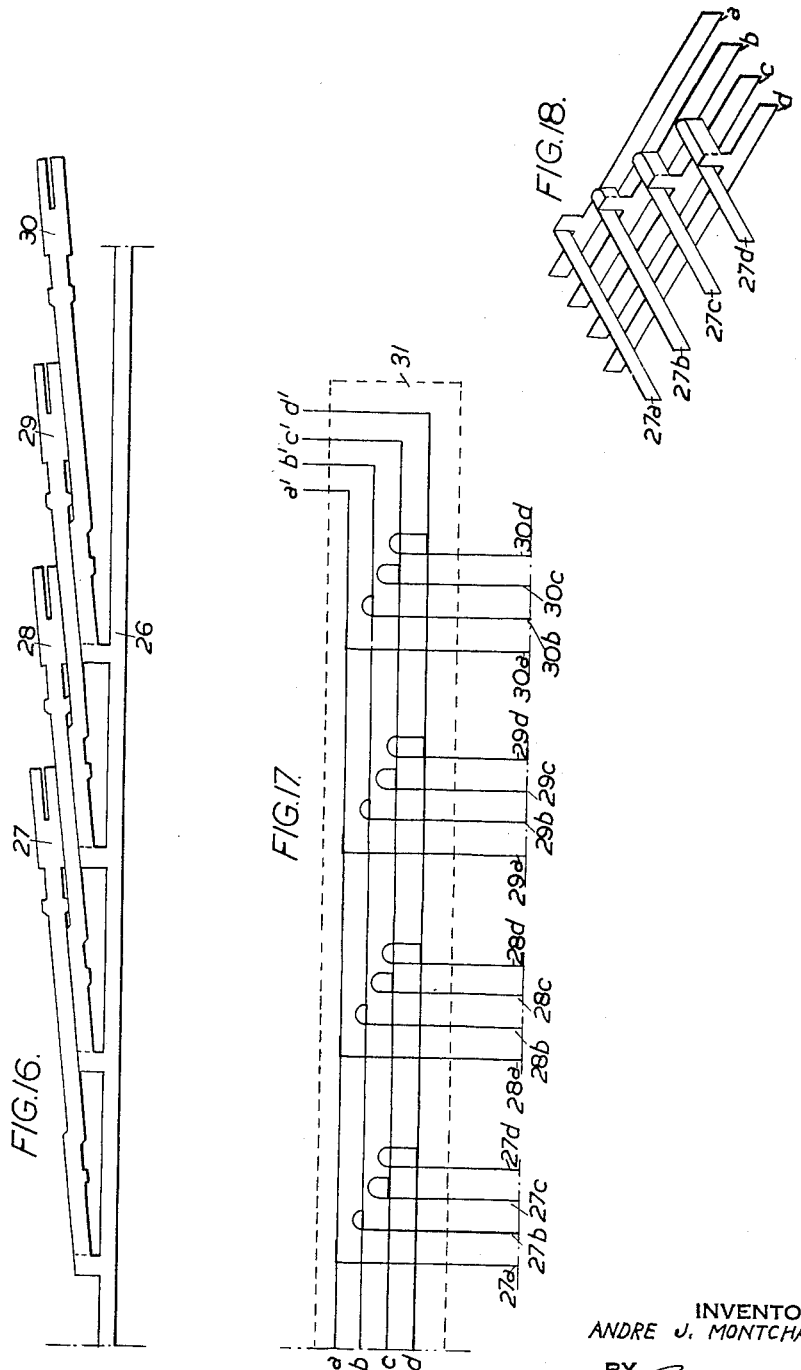

United States Patent Office 2,740,843
Patented Apr. 3, 1956

2,740,843

CROSS-BAR COMMUTATING MECHANISM

Andre J. Montchaussé, Paris, France, assignor to International Standard Electric Corporation, New York, N. Y., a corporation of Delaware Application January 26, 1950, Serial No. 140,735

Claims priority, application France February 10, 1949

4 Claims. (Cl. 179—27.54)

The present invention is concerned with the commutating mechanism controlled by cross-bars, permitting by the displacement of two bars, the operation of a movable piece to cause either a predetermined mechanical action, or the closure or the opening of electrical circuits. More particularly, this mechanism permits the displacement in two directions of one of the bars in order to cause two different actions with the same commutating assembly.

One of the characteristics of the invention resides in a commutating mechanism comprising two control bars movable in a longitudinal direction, a stop member, a clutch lever which, in its rest position, is engaged with the stop member and which, under the action of the first bar, is disengaged from the stop member and placed under the control of the second bar, the said lever acting during the displacement of the second bar, either directly, or indirectly on the movable commutating arrangement.

Another characteristic of the invention resides in a clutch lever rigid in the direction of displacement of the first bar and resilient in the direction of displacement of the second bar, the said lever having its two ends free in the direction of displacement of the first bar, and comprising a rigid clutch member capable of displacement in the direction of displacement of the second bar together with the lever with which it is associated, the said lever being subjected to the action of a resilient device in order to maintain in position of rest the clutch member in engagement with the stop member, while permitting its pivoting under the action of the first bar.

Another characteristic of the invention resides in the fact that the clutch lever can be displaced by one of the movable bars either to the right, or to the left of its rest position, and that for each of these displacements it causes a different action by the operation of a movable commutating device to which it is associated.

Another characteristic of the invention resides in the fact that when a clutch lever has been engaged with one of the movable bars and displaced by the said bar, it is maintained in an engaged position by the stop member and that, when the said movable bar returns to its rest position, the clutch lever is automatically brought back to its position of engagement with the stop member.

Another characteristic of the invention resides in the use of a spring as the resilient device acting on the clutch lever which, on one hand, exercises a push to bring the said lever into engagement with the stop member, and on the other hand maintains its back end in the lodging place which is provided for this purpose in a fixed support.

Another characteristic of the invention resides in the fact that the clutch lever can be freely displaced in the direction of displacement of one of the bars, in a movable piece belonging to the commutating device and that to the contrary, the said movable piece is joined to the movements of the lever in the direction of displacement of the other bar.

Another characteristic of the invention resides in the manner of realizing a selector mechanism for electrical circuits in which the commutating device is constituted by movable springs operated by the actuating piece joined to the clutch lever, the said movable springs capable of being brought into contact with one or the other of the two groups of fixed contacts, according to the direction of displacement of one of the bars.

Another characteristic of the invention resides in a method of obtaining movable springs common to several commutating devices and the multiplication thereof, realized by cutting the said springs and the multipling strip from a sheet of metal, the springs being then folded in order to bring them in a position perpendicular to the multipling strip, the said folding being effected with a loop varying in length according to the multipling position to be occupied in the selector assembly.

Another characteristic of the invention resides in making use of one or both ends of the multipling strips as "male" element for the joining of the selector to the electrical circuits by means of a plug of the "male" and "female" type.

The above-mentioned and other features and objects of this invention and the manner of obtaining them will become more apparent and the invention itself will be best understood, by reference to the following description of an embodiment of the invention taken in conjunction with the accompanying drawings, wherein:

Fig. 1, a side view of two commutating mechanisms of a selector;

Fig. 2, a plan view of Fig. 1;

Fig. 3, a cross-sectional view of a commutating mechanism showing the arrangement of the clutch lever;

Fig. 3-a, a cross-sectional view showing the arrangement of the lever and the clutch piece in its lodging in the piece operating the movable contacts;

Fig. 4, a perspective view of the clutch lever;

Fig. 5, a perspective view of the spring associated with the clutch lever.

Fig. 6, a side view of two commutating mechanisms, the one on the left being in the position reached after displacement of the vertical bar.

Fig. 7, a plan view in which the mechanism on the left is in the position reached after displacement of the horizontal bar to the right.

Figs. 8 and 9, the positions of the clutch lever during the displacement of the vertical bar;

Fig. 10, the position of a clutch lever of a busy selector during a displacement of the vertical bar.

Fig. 11, a side view, the left commutating mechanism having been operated by the horizontal bar;

Figs. 12, 13, 14, a different embodiment of the clutch lever;

Fig. 15, a different embodiment of the clutch piece part of a clutch lever;

Fig. 16, the means of obtaining, by cutting away, springs belonging to several commutating assemblies and their multiplication; and Figs. 17 and 18, the arrangement in a selector of different groups of movable springs and their multipling.

The construction of the commutating mechanism will first of all be described, with reference to Figs. 1 to 5.

This commutating mechanism comprises a predetermined number of movable springs 1 inserted at one of their ends in a fixed piece 2; these springs are all rigidly attached to movable piece 3 which can be displaced by means of a horizontal translation, either to the right or to the left; the free end of springs 1 can thus be brought into contact either with the bare wires of vertical multiple 4, or the bare wires of another vertical multiple 4'.

The lever 5 is constituted (Fig. 4) by a thin strip flexible in the horizontal direction but rigid in the vertical direction; it comprises at one of its ends a clutch piece 6 which can be fixed by soldering, riveting, or any other appropriate means.

The end 7 of lever 5 is disposed in a groove 8 provided in the fixed piece 2. The lever is maintained in its position by the action of a spring 9 the extremity 10 of which is located in a hole 12 provided in the fixed piece 2, and the arm corresponding to the said extremity, in a groove of the piece 2. The spring 9 being located in the piece 2 is maintained there by a piece 17' fixed on the said piece 2 (Fig. 3).

The free end 11 of the spring 9 is terminated with a hook which comes to rest in the notch 13 of lever 5.

In the rest position the spring 9 has the shape indicated in dotted lines on Fig. 5. When it has been put into position, as indicated on Fig. 3, the action of its hook 11 has the effect on the one hand to exercise a downward thrust on the lever 5 and on the other hand, to maintain the said lever in its position by preventing any appreciable displacement in the direction of its length.

The end 7 of lever 5 can slide vertically in the groove 8 of the piece 2; the clutch piece 6 can also slide vertically in its space in the movable piece 3 with a restricted play in the horizontal direction (Fig. 3-a). In the rest position, the lever 5 under the action of spring 9, comes to rest by means of the heel 16', on the fixed piece 17, the lower end of the clutch piece 6 being engaged in an aperture 15 provided in the said piece 17.

It can be seen that in this rest position the movable piece 3, the horizontal displacement of which is joined to that of lever 5, is locked by the clutch piece 6 with the fixed piece 17. Due to this, the movable springs 1 occupy a well defined rest position, in which they are not in contact with the wires of contacts 4 or 4'.

The lever 5 can be operated by the action of a pusher 18 rigid with a movable vertical bar 19, which can be displaced in the vertical direction.

The movable horizontal bar 20 can be displaced either to the right, or to the left.

The functioning of the commutating mechanism will now be explained, with reference to Figures 6 to 11.

The vertical bar 19 is displaced in the direction of the arrow 21, by any appropriate means; by means of its pusher 18, it lifts the lever 5 which rotates about its end 7, resting on the piece 2, the lever 5 slides in its aperture in the piece 3 and the clutch piece 6 leaves the aperture in the fixed piece 17 and engages its upper end in the aperture 22 of the movable horizontal bar 20. The lever 5 occupies then the position indicated on Fig. 8.

For reasons of security of operation the displacement of the vertical bar 19 is provided larger than necessary for the positioning of the lever 5 in the position shown on Fig. 8. In fact, the vertical bar 19 controls a series of levers such as 5 and it is necessary to be certain that, during its displacement, the clutch piece parts 6 of the levers are securely engaged with the movable horizontal bar with which each of them is associated.

When the clutch piece 6 is fully engaged in the aperture of piece 20, if the movement of vertical bar 19 is continued, the lever 5 comes to abut, by its heel 16 (Fig. 4) against the material surrounding the aperture in said piece 20. This heel 16 thence constitutes a resting point around which the lever 6 will rotate under the action of vertical bar 19, the action of said bar having the effect of lifting the end 7 of the lever which slides in the groove of the fixed piece 2. The lever 5 then comes into the position indicated on Fig. 9. It will be seen then that the spring 9 by resiliently anchoring the lever 5 to the fixed piece 2, constitutes a lost motion device.

It can be seen that this arrangement prevents a jamming of the vertical bar 19 when a lever 5 has been clutched with the corresponding horizontal bar and, due to this, permits a displacement of 19 sufficient to obtain with certitude a clutching with the horizontal bars of all the clutch levers which it controls.

When the displacement of the vertical bar 19 is terminated, the lever 5 occupies the position indicated in Figs. 6 and 9.

It will now be assumed that the horizontal bar 20 is displaced in the direction of the arrow 23, and comes into the position indicated on Fig. 6. In its movement the bar 20 will carry away the clutch piece 6, the displacement of which is rendered possible due to the flexibility of lever 5 in the horizontal direction. During the displacement of the piece 20, the piece 3 is carried away by the action of the clutch piece 6 and the movable springs 1 are thus brought in contact with the wires 4' (Fig. 7). The resilient flexion of the end of springs 1 permits the desired pressure on the wires 4'; furthermore, the slight sliding action due to this pressure ensures a cleaning of the contacts.

When the vertical bar 19 returns into its rest position, the action of the pusher 18 on the lever 5 is ended. Nevertheless, as long as the horizontal bar is in its working position, the clutch piece 6 which is no longer in register with aperture 15 of the fixed piece (Fig. 11), is maintained engaged with the said horizontal bar. The lever 5 is maintained in the position shown on Fig. 8.

It will be noted that when a commutating mechanism is in its working position the vertical bar with which it is associated can be utilized to cause the functioning of another mechanism associated with a different horizontal bar.

In this case the displacement of the vertical bar 19 has simply the effect of bringing the lever 5 of the commutating mechanism into the position indicated on Fig. 9, the said lever again taking up its position of Fig. 8 when the bar 19 comes back in the rest position.

When the horizontal bar 20 returns to its rest position by being displaced in the direction of the arrow 24 (Fig. 6), it carries away the clutch piece 6 the lower part of which slides on the fixed piece 17. The piece 6 carries away the piece 3 and consequently the contact springs 1. When the piece 6 arrives in register with aperture 15 in piece 17, it falls in the said aperture under the action of spring 9. The mechanism has then come back in its rest position as indicated on Figs. 1 to 3.

It has been assumed in the description which has been given that at the time of its functioning, the horizontal bar 20 had been displaced in the direction of the arrow 23 (Fig. 6). In the case where this displacement is effected in the direction of the arrow 24 the springs 1 are displaced towards the left and come then in contact with the bare wires 4.

It is seen that, due to the possibility of displacing the horizontal bar in the two directions, it is possible to connect an assembly of movable springs in two different assemblies of the fixed wires.

In the case where a lever 5 in the rest position, associated with a horizontal bar in a working position, is operated by the vertical bar 19, the aperture of the said horizontal bar no longer being in register with the clutch piece, its displacement will be effected by a rotating movement about the abutment point of the higher end of the clutch piece 6 against the horizontal bar 20 as indicated on Fig. 10.

It is seen that the movement of the vertical bar 19 is not hindered by levers such as 5 associated with the horizontal bars in their working position.

On Fig. 12 a different embodiment of the clutch lever has been shown. The movement of the clutch piece 6 is limited in the two directions, by the lateral abutments 25 and 25', the thickness of which is such that the total thickness of the lever 5 and the abutments will be greater than the width of the apertures in the pieces 17 and 20 (Figs. 13 and 14). These lateral abutments can be obtained, either by an increased thickness of the lever 5 or by an attached piece, or else by an appropriate shape of the end of the lever 5.

On the other hand, the lower and higher ends of the clutch pieces 6 can comprise inclined planes as indicated on Fig. 15.

By the combination of a certain number of vertical and horizontal controlling bars associated with commutating mechanisms such as that which has been described, it is possible to obtain a multiple commutator known as "crossbar" able to establish interconnections between multiple banks arranged horizontally and vertically.

As it has been indicated, the vertical multiple banks are obtained by means of bare wires.

It will now be explained how one can realize horizontal multipling of the various movable contact springs.

According to one of the characteristics of the invention, one obtains, by cutting away, in a single piece the movable springs and the multipling of the said springs. This cut-away part is represented on the Fig. 16. One then proceeds with the folding of the movable springs 27 to 30 following the dotted line, to bring them in a position perpendicular to the multipling strip 26.

Figs. 17 and 18 show, in plan and perspective views the arrangement of the contact springs of a four-wire selector comprising four assemblies of movable springs with multipling of each of the springs corresponding to different assemblies. The multipling strips are placed in the grooves of the insulated piece 31.

In order to simplify the manufacture, the different multiples are obtained by identical cut-out parts. In order to compensate the difference in lengths of the movable springs due to the position of the multipling strips, the folding is effected according to a loop of different lengths as indicated on Figs. 17 and 18.

The end $a'b'c'$ and $d'$ of the multipling strips which extends from the insulated piece 31 is used as male part in the joining by means of a "male" and "female" plug of the springs of the selectors to the electrical circuits.

The multipling strip 26 being of a reduced section, can, when it has a certain length, have an appreciable electrical resistance. In order to diminish the value of this resistance, one can according to the invention duplicate the said strip 26 by a thin lateral strip of a metal which is a good conductor of electricity, the two strips being joined one to the other by welding spots suitably spaced.

The end of the movable springs coming into contact with the bare wires of the vertical multiple can be, either provided with metal contacts of one of the commonly used types, fixed by soldering or riveting and preferably having an elongated shape in the direction of the length of the spring, or be covered, by any appropriate method, of a layer of metal which is a good conductor of electricity.

It is well understood that one could, without departing from the scope of the invention, provide any movable assembly associated directly or indirectly to the clutch lever.

What is claimed is:

1. A selector switch of the cross-bar type comprising a fixed frame, a plurality of parallel fixed conductors, a plurality of groups of parallel movable contact springs adjacent and extending in a direction normal to said conductors, means for selectively moving said groups into engagement with given of said conductors, said means characterized in that it comprises a plurality of clutch members each associated with and parallel to a different one of said spring groups, lost motion means coupling said clutch members with said frame, a first movable bar for moving said clutch member in a first direction, a second movable bar for moving said clutch members in a second direction, said second direction normal to said first direction, said second bar comprising means for engaging said clutch members when said clutch members are moved in said first direction, said last named means cooperating with said clutch members and first movable bar to render said lost motion means effective, and a fixed member for maintaining said clutch members in engagement with said second bar after actuation of said second bar and independent of the position of said first bar.

2. The switch according to claim 1, wherein said clutch member comprises a lever rigid when moved in said first direction and resilient when moved in said second direction, upper and lower vertically disposed studs at one end of said lever, said fixed member underlying a portion of said lever, apertures provided in said fixed member and said second movable bar, the apertures being aligned when the switch is unoperated and the lower stud resting in the aperture of the fixed member, said lost motion means comprising a resilient element coupling the other end of said lever with said frame, said resilient element acting to normally maintain the lower stud in the aperture of said fixed member.

3. The switch according to claim 2, wherein said first movable bar comprises a projection for engaging said lever, whereby when said bar is moved said lever is correspondingly raised and the lower stud is disengaged from the aperture in the fixed member and the upper stud engages the aperture in second movable bar, whereupon the movement of said second movable bar causes the lever and attached contact springs to similarly move, said fixed member adapted to maintain said lever in engagement with said second movable bar during the movement thereof, and said first movable bar being permitted to return to its unoperated condition after the commencement of the movement of said second movable bar.

4. The switch according to claim 3, wherein said lever is maintained in engagement with said second movable bar by means of the studs being of such height that it is greater than the distance between said fixed member and said second movable bar, whereby when the apertures in said second movable bar and said fixed member are out of alignment and the upper stud is engaged in its associated aperture the lower stud moves against the surface of said fixed member.

References Cited in the file of this patent

UNITED STATES PATENTS

| 1,484,771 | Goodrum | Feb. 26, 1924 |
|---|---|---|
| 1,563,658 | Richard | Dec. 1, 1925 |
| 2,082,911 | Schneckloth | June 8, 1937 |
| 2,117,702 | Burwell | May 17, 1938 |
| 2,252,899 | Reynolds | Aug. 19, 1941 |
| 2,458,552 | Blattner | Jan. 11, 1949 |
| 2,517,022 | Peek | Aug. 1, 1950 |
| 2,535,769 | Wicks | Dec. 26, 1950 |
| 2,554,108 | Knos | May 22, 1951 |